United States Patent [19]

Bindel

[11] 4,411,301
[45] Oct. 25, 1983

[54] TIRE TRACTION CHAIN

[76] Inventor: Paul Bindel, 3946 W. North Ave., Chicago, Ill. 60647

[21] Appl. No.: 428,150

[22] Filed: Sep. 29, 1982

[51] Int. Cl.³ ............................................. B60C 27/00
[52] U.S. Cl. .............................. 152/213 R; 24/68 BT; 152/222; 152/223; 152/233; 152/236; 403/43
[58] Field of Search ........... 152/233, 236, 224, 213 R, 152/216, 218, 220, 222, 223, 231, 232; 403/43, DIG. 9; 24/279, 280, 284, 68 BT, 20 LS

[56] References Cited

U.S. PATENT DOCUMENTS

| 2,244,218 | 6/1941 | Rollings | 152/224 |
| 2,259,189 | 10/1941 | Williams et al. | 152/224 |
| 2,955,634 | 10/1960 | Schieber et al. | 152/233 |
| 3,064,703 | 11/1962 | Schieber et al. | 152/233 |
| 3,133,582 | 5/1964 | Schieber et al. | 152/233 |
| 3,208,498 | 9/1965 | Schieber et al. | 152/225 R |
| 3,566,949 | 3/1971 | Schieber et al. | 152/237 |
| 4,222,425 | 9/1980 | Bindel | 152/233 X |

Primary Examiner—William A. Powell
Assistant Examiner—Thomas Bokan
Attorney, Agent, or Firm—William A. Snow

[57] ABSTRACT

A single tire chain adapted to be placed on an automobile tire and be anchored at its ends in front of and through an opening in the wheel.

3 Claims, 7 Drawing Figures

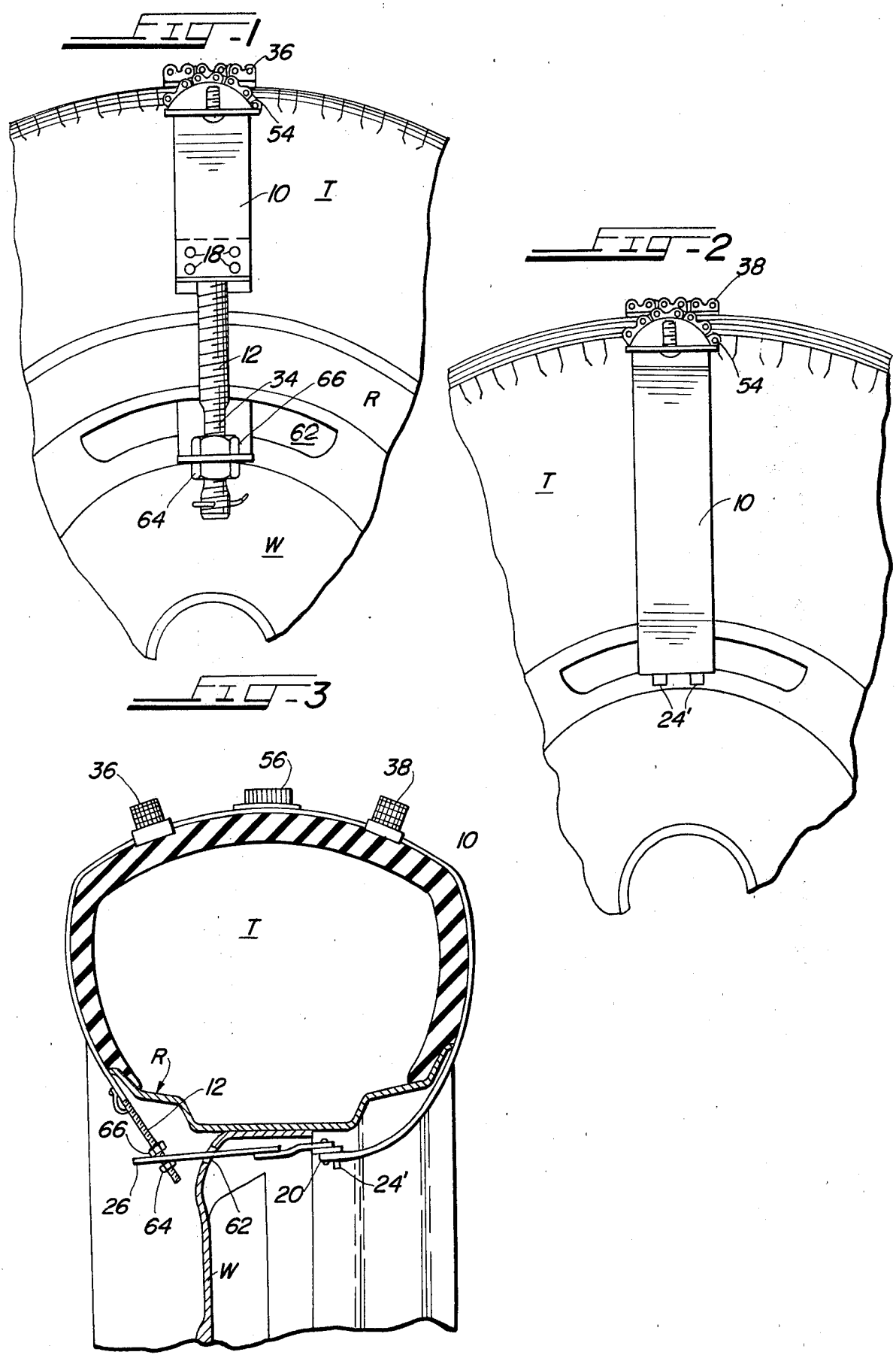

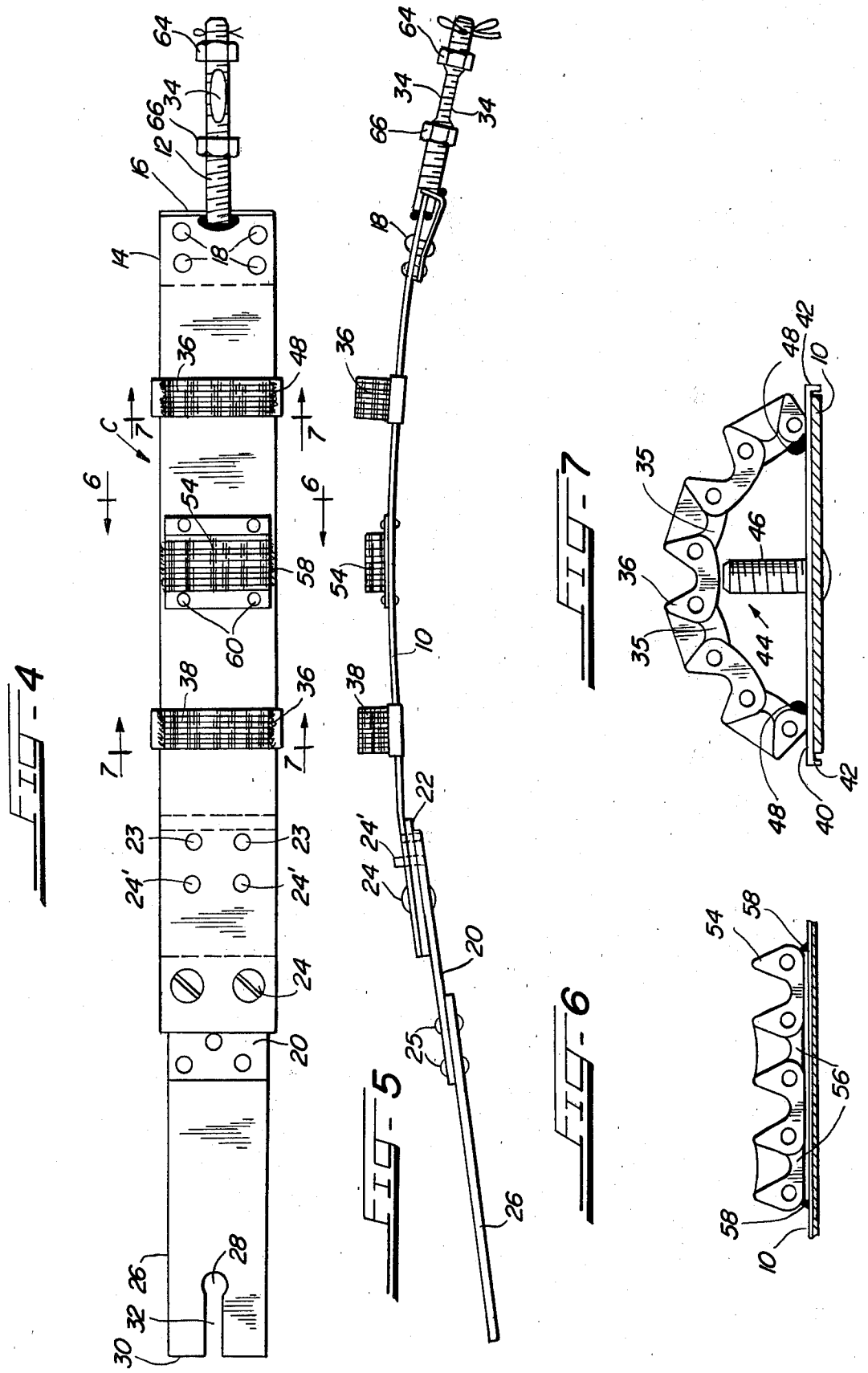

TIRE TRACTION CHAIN

BACKGROUND OF INVENTION

Applicant is the co-inventor of U.S. Pat. Nos. 2,955,634; 3,133,582; 3,208,498 and 3,566,949, all of which are for tire traction chains but are more complicated than the present invention, and the present invention is a vast improvement thereover.

SUMMARY OF INVENTION

The present invention is directed to a simplified vehicle traction chain wherein the ground gripping surfaces are a pair of spaced traction elements having an arcuate shape and a traction element medially positioned therebetween but flat on the steel band encompassing the tread of the tire and the sides thereof with a unique anchoring device to support the traction device on the tire.

BRIEF DESCRIPTION OF DRAWINGS

FIG. 1 is a front view of the tire and the traction element thereon.

FIG. 2 is a rear view of FIG. 1.

FIG. 3 is a partial vertical cross-sectional view through the tire and an end view of the device of the present invention shown positioned on the tire.

FIG. 4 is a top flat view of the traction element only.

FIG. 5 is a side view thereof.

FIG. 6 is a cross sectional view taken on the lines 6—6 of FIG. 4.

FIG. 7 is a cross sectional view taken on the lines 7—7 of FIG. 4.

DETAILED DESCRIPTION OF DRAWINGS

The traction chain C of the present invention is positioned on a tire T supported in the usual manner on the run R on wheel W.

The device of the present invention comprises a steel band 10 having a width of substantially 2¾ inches, a length of about 17 inches. The band has a curvature. One end of the band is provided with a threaded steel rod 12 having one end welded to a plate 14 having one end provided with a right angle bend 16 and the plate anchored to band 10 by headed rivets 18.

The opposite end of the band 10 is provided with a flexible pad 20 anchored at one end to the band 10. The pad is provided with short plate 22 with its upper side adjacent one end of the pad and anchored thereto by screws 24 extending through threaded openings in band 10. The band 10 is provided with a pair of prongs 24' which extend upwardly through spaced pairs of apertures in the plate 22 and the pad 20.

The free end of the pad 20 is anchored to one end of an elongated plate 26 on the lower side thereof by rivets 25. The free end of plate 26 is provided with a cleft 32 terminating in the aperture 28. The cleft has a width smaller than the diameter of the aperture. The aperture 28 is larger than the threaded rod 12.

The threaded rod is provided with flat surfaces 34 to readily receive the cleft 32.

The band 10 is provided with a pair of spaced permanently set arcuately, shaped, multiple parallel series of pronged links 36, 38 hinged together by connectors 35. The end links are anchored to a bar 40 having the ends 42 thereof extending at right angles over the edges of the band 10 to engage the edges of said band. (See FIG. 7). The bar 40 is anchored to the band 10 by a machine screw 44 through a threaded aperture in the band 10 and bar 40. The shank 46 of the screw 44 extending upwardly through the bar 40 and band 10 as shown in FIG. 7 and terminating just below the middle pronged member.

The end links are held in arcuate position by the welds 48 to hold them in permanent arcuate position.

A multiple series of pronged links 54 extending between connectors 56 are fixed flat on a plate by welds 58 and the plate is anchored to the band 10 by rivets 60. The pair of spaced prongs 24' are secured to the band 10 and extend upwardly through either pair of openings 23. This is to accommodate various sizes of tires.

In operation, the band is placed on the treads of the tire with the threaded rod 12 in the front of the tire. The plate 26 is placed on the rear of the tire and inserted and drawn through the usual arcuate opening 62 through the rear of the rim. (See FIG. 3). Thr flattened portions 34 of the threaded rod 12 are then inserted through the cleft 32 and the rod shifted to the aperture 28. The nut 64 tightened against the nut 66 to hold the traction chain on the tire. The nut 64 having been threaded on the rod 12 and adjusted beforehand determined by the size of the tire.

The reason for having the medial flat links lower than the arcuate links 36, 38 is that it will be used on concrete and macadam highways and the arcuate links come into play on snow and mud simultaneously with the flat links.

This device is inexpensive and when applied to both rear tires (or front tires when the automobile has a front wheel drive) it gives the automobile complete drivability.

Although one specific embodiment of the invention is shown, it is to be understood that numerous details may be altered or omitted as defined by the following claims.

I claim:

1. A tire traction chain comprising an arcuate band having an upper face, a pair of spaced permanently set arcuately shaped multiple parallel series of pronged links set cross-wise on said upper face of said band, a third set of multiple series of pronged links anchored flat on said upper face of said band medially between said arcuately shaped multiple parallel series of pronged links and cross-wise on the upper face of said band, and means to removably anchor said band on an automobile tire.

2. The device according to claim 1 wherein an elongated threaded rod has one end secured to one end of said band and containing spaced nuts thereon, the other end of said band having an elongated flexible pad secured at one end thereto, an elongated plate having one end secured to said pad, the free end of said plate having an elongated cleft extending inwardly of the free end thereof and terminating in an aperture.

3. The device according to claim 1 wherein the end of each of said arcuate shaped multiple parallel series of pronged links are positioned on a plate, the ends of said plate bent at right angles to engage the edges of said band, said multiple parallel series of pronged links are welded at the ends thereof to said plate to maintain an arcuate shape, said plate being anchored to said band by an elongate screw medially of the width of said plate and the shank of said screw extending upwardly to just below the middle link.

* * * * *